PERIODICALLY VARYING REACTANCE DEVICE

Filed July 11, 1945

INVENTORS.
EMILE LABIN
MICHEL POYLO
BY Percy P. Lantzy
ATTORNEY

Patented Jan. 31, 1950

2,495,741

UNITED STATES PATENT OFFICE 2,495,741

PERIODICALLY VARYING REACTANCE DEVICE

Emile Labin and Michel C. Poylo, New York, N. Y., assignors to Federal Telephone and Radio Corporation, New York, N. Y., a corporation of Delaware Application July 11, 1945, Serial No. 604,330

5 Claims. (Cl. 171—242)

This invention relates to electronic apparatus and more particularly to a device for use with such apparatus which makes it possible to scan therewith one or more given bands of frequencies.

Heretofore, devices for scanning given bands of frequencies in radio communication apparatus have taken the form of a rotary element which is operated with given tuning elements for radio circuits such as circuit inductances or capacitances whereby such tuning elements will periodically or cyclically subject said inductances or capacitances to a variation in their tuning characteristics. An example of this type of scanning device is provided in apparatus wherein a circuit tuning inductance has been split into two halves and an electro-conductive member has been disposed intermediate the two halves of the inductance and rotated continuously with respect thereto. The rotary member is shaped in such a manner that the portion extending into the gap between the two inductance halves varies in its expanse therein whereby the mutual inductance and consequently the tuning characteristic of the inductance as a whole is varied in accordance with the said expanse. The rotary member is comprised of a disc of insulating material such as plastic or glass with a metallic foil or other conductive coating placed on one side thereof.

Such a disc conduction, however, introduces irregularities in the scanning frequency when it is driven at fairly high speed such as 4800 R. P. M. These irregularities we find, are caused by a small wobble that is extremely difficult to avoid at such speeds and/or because of irregularities in the structural arrangement of the disc and conductive coating.

It is an object of this invention to provide a scanning device of the above-described character which has an improved tuning accuracy.

Another object of the invention is to provide a scanning disc which accomplishes a more constant tuning of the circuit inductances.

A further object is to provide a scanning disc which has an improved mechanical construction both in respect to dynamic and temperature factors.

A still further object is to provide a frequency scanning disc which has a minimum effect on the tuning due to any mechanical wobble in the drive thereof.

In accordance with the invention one or more inductive tuning circuits for radio communication apparatus may be provided in the form of split induction coils, each of the inductances being adapted to be connected into the main circuit for the purpose of covering a given band of frequencies. These coils are mounted on a rotatable turret whereby it is possible to selectively place the various tuning inductances into contact with the main circuit for band switch purposes. Intermediate the two halves of each of the frequency band tuning coils there is positioned in a rotary relationship thereto a frequency scanning disc comprised of an insulator member such as glass which has mounted on both sides thereof a metallic foil preferably of copper or a silver deposit shaped to provide a predetermined frequency scanning characteristic in respect to the rotation of the disc. The metallic deposits on the sides of the disc are similar to one another and are spaced from the edge of the disc to avoid irregularities in the edges of the glass or plastic.

These and other features and objects of our invention will become more apparent upon consideration of the detailed description of an embodiment of the invention to be read in connection with the accompanying drawings in which.

Figure 1:
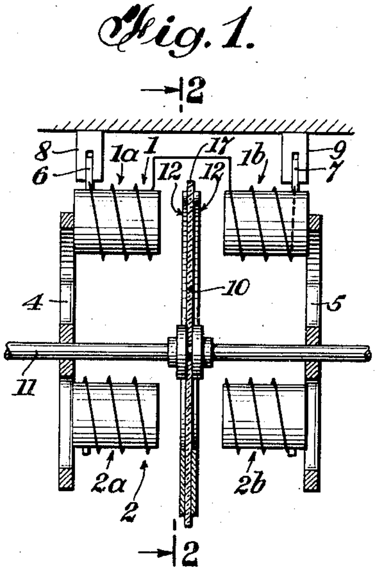
Fig. 1 is a schematic representation in elevation of a tuning disc and associated circuit tuning coils in accordance with the invention.
Figure 2:
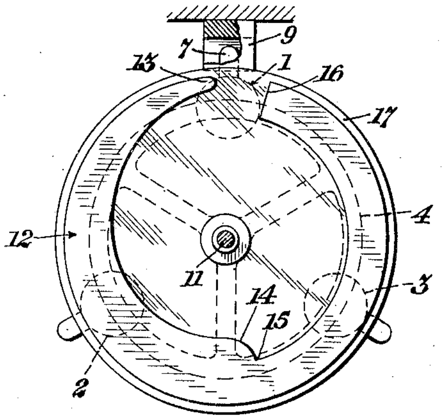
Fig. 2 is a schematic view in section on lines 2—2 of the scanning arrangement of Fig. 1.

Referring to Figs. 1 and 2, and plurality of circuit tuning inductance coils 1, 2 and 3 which are each comprised of two halves as at 1a, 1b; and 2a, 2b; are mounted on two circular members 4 and 5 which together form a rotatable turret mechanism. The respective coil halves are terminated in contacts as at 6 and 7 which cooperate with corresponding contact members 8 and 9 leading to the main circuit which is to be tuned. By suitable rotation of the coil mounting turret 4—5 the respective inductances may be brought into the circuit to cover a desired band of frequencies. Intermediate the two tuning coil halves as 1a and 1b, there is mounted for rotation with respect thereto a tuning disc 10 which may be continuously rotated on a shaft 11 by any suitable driving means. The disc 10 may comprise an insulating member composed of a suitable plastic or glass and has mounted on both sides thereof preferably a thin deposit of silver 12. This thin conductive desposit may take any desired shape, and as shown in Fig. 2, has a width tapering to a minimum at one end 13 and gradually expanding to a maximum width at a point 14. Following the point of maximum width at 14, the width of the conductive portion is reduced as indicated at point 15, wherefrom the radial width thereof remains fixed throughout the remaining extent of the metallic deposit until the deposit is terminated at a point 16.

Figure 3:
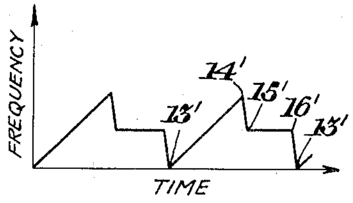
Fig. 3 is a graph showing the variation of frequency with time of a signal output of a circuit employing the scanning disc of Figs. 1 and 2.

The coating of silver is preferably spaced from the edge of the disc as at 17 so as to avoid irregularities in the edges of the glass whereby a more even edge of the silver deposit is obtainable. One of the advantages in placing the silver deposit on both sides of the disc is that the silver may be thinner and thereby avoid peeling due to temperature changes because of the difference in the coefficient of expansion between glass and silver. Another advantage of having the deposit of silver on both sides of the disc, is that it overcomes variations of tuning heretofore caused by mechanical wobble in the operation of the disc. That is, any wobble effect causing the conductive coating to deviate from one coil half causes the other coating to be brought into corresponding closer relation to the opposite coil half. Thus, wobble of disc 10 no longer adversely affects the tuning according to our construction. This is particularly important where it is desirable to produce a linear tuning such as indicated between 15′ and 16′, for example, on the scanning frequency cycle shown in Fig. 3. The two coatings on opposite sides of the disc insure this linear tuning regardless of wobble or variation of symmetrical positioning of the disc between the two tuning elements.

In operation, the disc is rapidly rotated intermediate the two halves of the respective inductance coils connected into the main circuit. The width of the conductive portions on the disc, present in the gap between the associated coil halves at any one time, causes a corresponding variation in the total mutual inductance and thereby determines the tuning of the inductance. The characteristic relationship between frequency and time of rotation for each cycle in accordance with the shape of the silver deposit as shown in Fig. 2 may be seen in Fig. 3 wherein a linear increase in the frequency 13′ to 14′ is followed by a small gradual drop to 15′ and then continues in a constant frequency 15′ to 16′ ending in a sharp drop 16′ to 13′ thereby completing the rotary cycle. Other frequency time characteristics may of course be had by suitably shaping the silver deposits.

It will be seen from the above therefore that we have provided an improved frequency scanning device which may be used to cover one or more sections of a given frequency band. It will also be clear that the tuning elements may comprise condenser plates in place of the inductance coils shown. Thus, while we have described above the principles of our invention in connection with a specific form of disc and inductance coil elements, it is to be clearly understood that this description is made only by way of example and not as a limitation on the scope of our invention as set forth in the objects and the accompanying claims.

We claim:

1. A periodically varying reactance device comprising a tuning element for tuning a circuit to a given frequency band comprised of two portions forming a tunable field unit, and a disc of insulating material having an irregularly shaped electro-conductive portion on each side thereof, said disc being rotatably disposed in said field intermediate the said portions of said tuning element to vary the tuning characteristic in accordance with the shape of the conductive portions thereof.

2. A periodically varying reactance device as claimed in claim 1, wherein said tuning element comprises a coil having two separated coil portions, and said disc is so disposed as to bring its conductive portions during rotation substantially intermediate said coil portions.

3. A periodically varying reactance device as claimed in claim 1, wherein said disc is comprised of glass.

4. A periodically varying reactance device as claimed in claim 1, wherein said conductive portion comprises a silver deposit on each side of said disc.

5. A periodically varying reactance device as claimed in claim 1 wherein said conductive means comprises a metallic deposit disposed along substantially the major portion of the periphery of each side of said disc and spaced from the edges thereof.

EMILE LABIN.
MICHEL C. POYLO.

REFERENCES CITED

The following references are of record in the file of this patent:

UNITED STATES PATENTS

| Number | Name | Date |
|---|---|---|
| 1,432,455 | Goldsmith | Oct. 17, 1922 |
| 1,558,473 | Gordon | Oct. 27, 1925 |
| 1,679,459 | Willans | Aug. 7, 1928 |
| 2,075,125 | Mabry | Mar. 30, 1937 |
| 2,204,206 | Brunner | June 11, 1940 |